(12) United States Patent
Oveyssi

(10) Patent No.: US 6,816,343 B1
(45) Date of Patent: Nov. 9, 2004

(54) DISK DRIVE INCLUDING AN ACTUATOR COIL WITH SIDE SEGMENTS EQUALLY OVERLAPPING INNER AND OUTER MAGNET SETS

(75) Inventor: Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 134 days.

(21) Appl. No.: 10/355,515

(22) Filed: Jan. 31, 2003

(51) Int. Cl.[7] ............................................... G11B 5/55
(52) U.S. Cl. ................................. 360/265; 360/264.9
(58) Field of Search .............................. 360/265, 264.9

(56) References Cited

U.S. PATENT DOCUMENTS

| | | | |
|---|---|---|---|
| 5,295,031 A | | 3/1994 | Wasson |
| 5,523,911 A | | 6/1996 | Mita et al. |
| 5,621,591 A | * | 4/1997 | Rahimi et al. ............... 360/265 |
| 5,764,441 A | | 6/1998 | Aruga et al. |
| 6,104,581 A | | 8/2000 | Huang et al. |
| 6,225,712 B1 | * | 5/2001 | Miyamoto et al. .......... 360/265 |
| 6,633,457 B1 | * | 10/2003 | Lin et al. .................. 360/264.9 |

* cited by examiner

*Primary Examiner*—Robert S. Tupper
(74) *Attorney, Agent, or Firm*—Won Tae C. Kim, Esq.; Milad G. Shara, Esq.; Stetina Brunda Garred & Brucker

(57) ABSTRACT

A disk drive includes a magnetic element and a coil. The magnetic element includes an inner magnet set including first and second inner magnets. The magnetic element further includes an outer magnet set including first and second outer magnets. The first outer magnet is circumferentially disposed along the first inner magnet. The second outer magnet is circumferentially disposed along the second inner magnet. The coil is attached to a coil support of an actuator and disposed overlapping within a magnet periphery of the magnetic element. The coil includes an inner segment, an outer segment, and a pair of side segments electrically connecting the inner and outer segments. The inner segment is disposed overlapping with the inner magnet set, the outer segment being disposed overlapping with the outer magnet set. Each of the side segments is disposed equally overlapping with the inner and outer magnet sets.

11 Claims, 3 Drawing Sheets

DISK DRIVE INCLUDING AN ACTUATOR COIL WITH SIDE SEGMENTS EQUALLY OVERLAPPING INNER AND OUTER MAGNET SETS

BACKGROUND OF THE INVENTION

CROSS-REFERENCE TO RELATED APPLICATIONS

Not applicable.

1. Field of the Invention

The present invention relates generally to disk drives, and in particular to a disk drive including an actuator coil with side segments equally overlapping inner and outer magnet sets.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost one of the disks. Additional disks may be stacked and separated with annular disk spacers that are disposed about the hub. The head stack assembly has an actuator assembly having at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically includes an actuator having an actuator body. The actuator body is configured to rotate on a pivot assembly between limited positions about an axis of rotation. A coil support extends from one side of the actuator body. A coil is supported by the coil support and is configured to interact with one or more permanent magnets to form a voice coil motor. One or more actuator arms extend from an opposite side of the actuator body. A head gimbal assembly includes a transducer head, typically a magnetoresistive ("MR") head, which is distally attached to each of the actuator arms. To facilitate rotational movement of the actuator, the actuator assembly further includes the actuator body that has a bore and a pivot bearing cartridge engaged within the bore. Each magnetic disk includes opposing disk surfaces. Data may be recorded on a single surface or both along data annular regions. As such, the head stack assembly may be pivoted such that each transducer head is disposed adjacent the various data annular regions from adjacent the outer diameter to the inner diameter of each disk.

The actuator assembly has various natural modes of vibration. One such mode is referred to as a "butterfly" mode or the first principal bending mode. During such a butterfly mode, the actuator arms and the coil support slightly flex or bend toward and away from each other in a plane orthogonal to the axis of rotation and the heads move away from its position on the disk. This is due to those electromagnetic forces in a direction perpendicular to a longitudinal axis of the actuator produced by the current through the coil and the electromagnetic forces interaction with the magnetic field of the magnets. Thus, if the natural frequency of the butterfly mode is 5 kilo hertz and the applied current into the coil has a 5 kilo hertz component, then this will result in the potential for undesirable excitation of the butterfly mode. While a filter, such as a notch filter, may be used to remove the frequency component corresponding to the natural frequency of the butterfly mode, that may negatively impact the capability of the actuator servo control system by reducing its bandwidth. Accordingly, there is a need in the art for a disk drive having an improved actuator coil and magnet design in comparison to the prior art.

SUMMARY OF THE INVENTION

An aspect of the present invention can be regarded as a disk drive including a disk drive base. The disk drive further includes an actuator rotatably coupled to the disk drive base. The actuator includes an actuator body configured to pivot about an axis of rotation and a coil support extending from the actuator body. The disk drive further includes a magnetic element coupled to the disk drive base and defining a magnet periphery. The magnetic element includes an inner magnet set including first and second inner magnets having opposing field directions. The magnetic element further includes an outer magnet set including first and second outer magnets. The first outer magnet is circumferentially disposed along the first inner magnet and has a field direction opposite the field direction of the first inner magnet. The second outer magnet is circumferentially disposed along the second inner magnet and has a field direction opposite the field direction of the second inner magnet. The disk drive further includes a coil attached to the coil support and disposed overlapping within the magnet periphery. The coil includes an inner segment, an outer segment, and a pair of side segments electrically connecting the inner and outer segments. The inner segment is disposed overlapping with the inner magnet set. The outer segment is disposed overlapping with the outer magnet set. Each of the side segments is disposed equally overlapping with the inner and outer magnet sets.

According to various embodiments, the first inner magnet, the second inner magnet, the first outer magnet, and the second outer magnet may have substantially equal surface areas disposed towards the coil support. The first inner magnet, the second inner magnet, the first outer magnet, and the second outer magnet may be generally arced rectangular shaped. The coil may be generally oval shaped, generally rectangular shaped, or generally trapezoidal shaped. The outer segment may be longer than the inner segment. The coil may be disposed within a plane orthogonal to the axis of rotation. The field directions of the first inner magnet, the second inner magnet, the first outer magnet, and the second outer magnet may be parallel to the axis of rotation. The magnetic element may be a first magnetic element and the magnet periphery may be a first magnet periphery. The disk drive may further include a second magnetic element coupled to the disk drive base and define a second magnet periphery. The coil may be disposed between the first and second magnetic elements. The second magnetic element may includes an inner magnet set including first and second inner magnets having opposing field directions, and an outer magnet set including first and second outer magnets. The first outer magnet may be circumferentially disposed along the first inner magnet and having a field direction opposite the field direction of the first inner magnet. The second outer magnet may be circumferentially disposed along the second inner magnet and having a field direction opposite the field direction of the second inner magnet.

DESCRIPTION OF THE PREFERRED EMBODIMENTS

Figure 1:
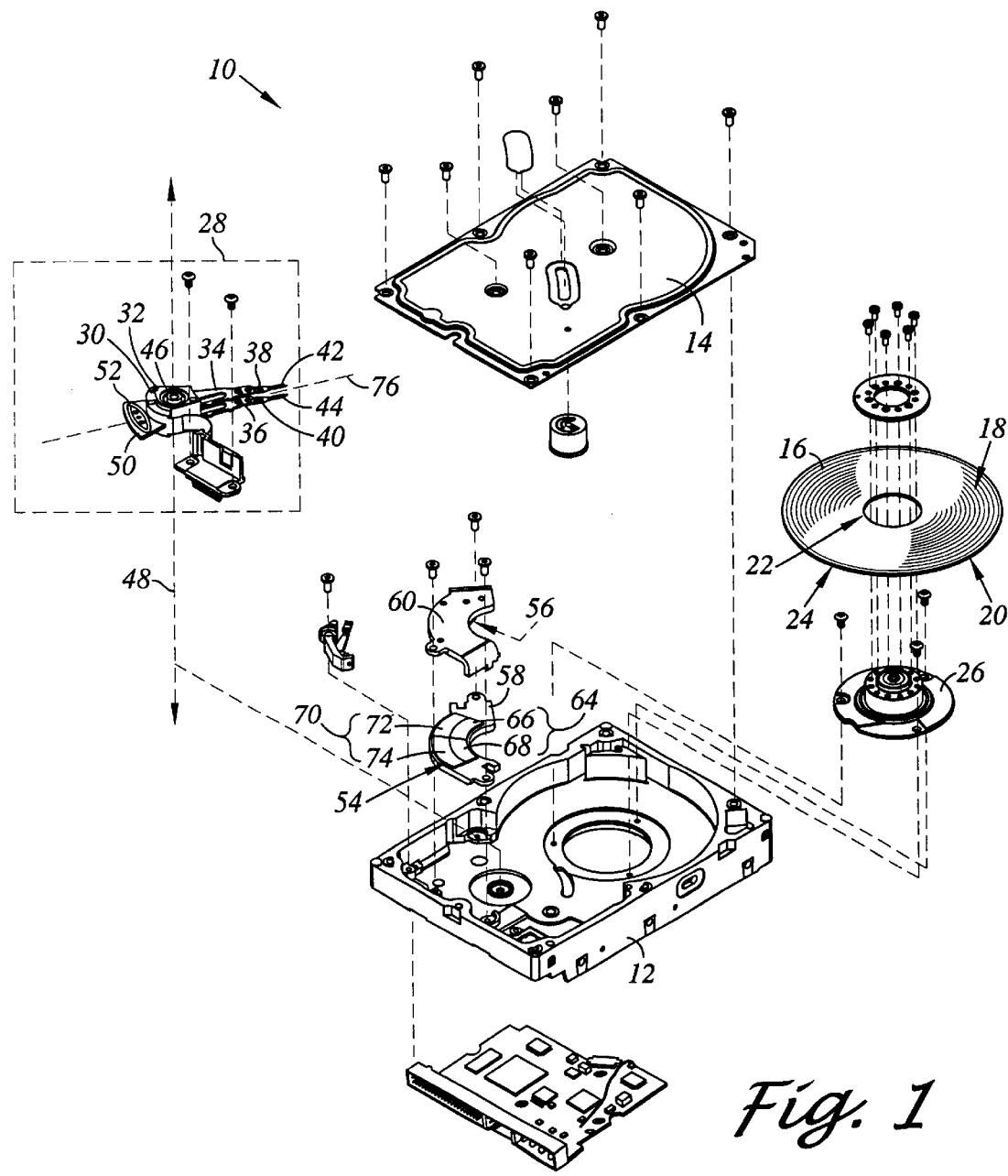
FIG. 1 is an exploded perspective view of a disk drive including an actuator with a coil support supporting a coil as constructed in accordance with the present invention.

Referring now to the drawings wherein the showings are for purposes of illustrating preferred embodiments of the present invention only, and not for purposes of limiting the same, FIGS. 1–8 illustrate a disk drive in accordance with the aspects of the present invention. Referring now to FIG. 1, there is depicted an exploded perspective view of a disk drive 10 as constructed in accordance with an aspect of the present invention. The disk drive 10 includes a head disk assembly (HDA) and a printed circuit board assembly (PCBA). The head disk assembly includes a disk drive base 12 and a cover 14 that collectively house at least one magnetic disk 16. The disk 16 contains a plurality of tracks for storing data. The tracks are disposed upon opposing first and second disk surfaces 18, 20 of the disk 16 that extend between an inner disk edge 22 (associated with the inner diameter) and an outer disk edge 24 (associated with the outer diameter) of the disk 16. The head disk assembly further includes a spindle motor 26 for rotating the disk 16. The head disk assembly further includes a head stack assembly 28 rotatably attached to the disk drive base 12 in operable communication with the disk 16. The head stack assembly 28 includes a rotatable actuator 30. In the embodiment shown, the actuator 30 includes an actuator body 32 and first and second actuator arms 34, 36 that extend from the actuator body 32. Distally attached to the first and second actuator arms 34, 36 are first and second suspensions 38, 40. The first and second suspensions 38, 40 respectively support transducer heads 42, 44. It is contemplated that the number of actuator arms may vary depending upon the number of disks and disk surfaces utilized. The actuator body 32 includes a bore, and the actuator 30 further includes a pivot bearing cartridge 46 engaged within the bore for facilitating the actuator body 32 to rotate between limited positions about an axis of rotation 48. The actuator 30 further includes a coil support 50 that extends from one side of the actuator body 32 opposite the first and second actuator arms 34, 36. In this embodiment, the coil support 50 is configured to support a coil 52. A pair of magnetic elements 54, 56 is supported to mounts 58, 60 which are attached to the disk drive base 16 (magnetic element 56 is indicated by the dashed lead line and it is understood the magnetic element 56 is disposed underneath the mount 60). The magnetic elements 54, 56 may be attached to the disk drive base 12 through other arrangements, such as the magnetic element 56 being directly mounted to the cover 12 which is mechanically engaged with the disk drive base 12. The coil 52 interacts with the magnetic elements 54, 56 to form a voice coil motor for controllably rotating the actuator 30.

Figure 2:
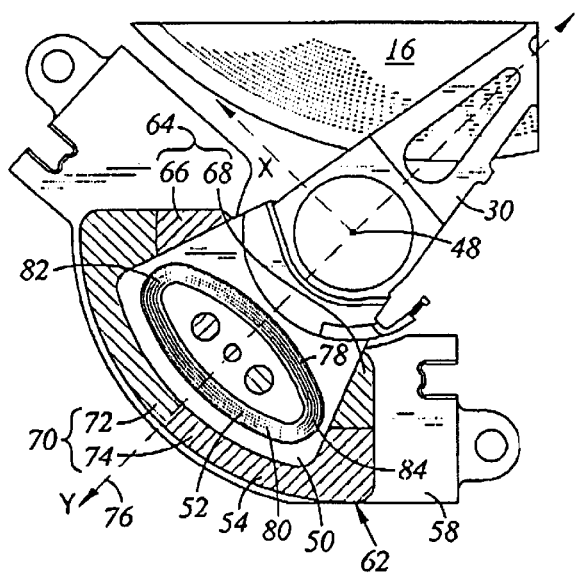
FIG. 2 is an enlarged plan view of a portion of the actuator as shown generally assembled with a portion of a magnetic disk and a magnetic element of FIG. 1.
Figure 3:
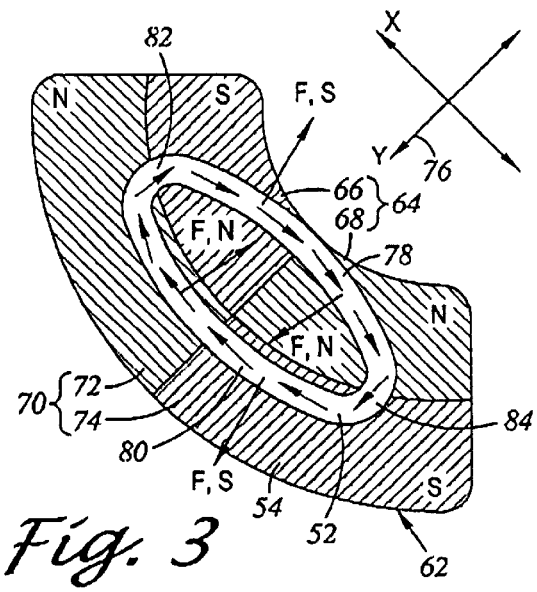
FIG. 3 is an enlarged plan view of a portion of FIG. 2 depicting the coil and the magnetic element with symbolic lines indicative of current through the coil and force lines indicating electro-magnetic forces associated with segments of the coil.
Figure 4:
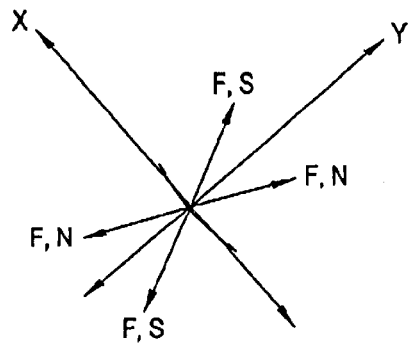
FIG. 4 is a force diagram of those forces symbolically indicated in FIG. 3.

Referring additionally to FIG. 2, there is depicted an enlarged plan view of the actuator 30 as shown generally assembled with a portion of the magnetic element 54 and a portion of the magnetic disk 16 of FIG. 1. FIG. 3 is an enlarged plan view of a portion of FIG. 2 depicting the coil 52 in relation to the magnetic element 54. For ease of discussion, in this figure the remaining portions of the actuator 30 are not depicted, such as the actuator body 32 and the coil support 50.

An aspect of the present invention can be regarded as the disk drive 10 including the disk drive base 12. The disk drive 10 further includes the actuator 30 rotatably coupled to the disk drive base 12. The actuator 30 includes the actuator body 32 configured to pivot about the axis of rotation 48 and the coil support 50 extending from the actuator body 32. The disk drive 10 further includes a magnetic element, such as magnetic element 54 of magnetic elements 54, 56. The magnetic element 54 is coupled to the disk drive base 12 and defines a magnet periphery 62. The magnetic element 54 includes an inner magnet set 64 including first and second inner magnets 66, 68 having opposing field directions. The magnetic element 54 further includes an outer magnet set 70 including first and second outer magnets 72, 74. The first outer magnet 72 is circumferentially disposed along the first inner magnet 66 and has a field direction opposite the field direction of the first inner magnet 66. The second outer magnet 74 is circumferentially disposed along the second inner magnet 68 and has a field direction opposite the field direction of the second inner magnet 68. The disk drive 10 further includes the coil 52 attached to the coil support 50 and disposed overlapping within the magnet periphery 62. The coil 52 includes an inner segment 78, an outer segment 80, and a pair of side segments 82, 84 electrically connecting the inner and outer segments 78, 80. The inner segment 78 is disposed overlapping with the inner magnet set 64. The outer segment 80 is disposed overlapping with the outer magnet set 70. Each of the side segments 82, 84 is disposed equally overlapping with the inner and outer magnet sets 64, 70.

As mentioned above, the coil 52 is disposed overlapping within the magnet periphery 62. As used herein being disposed overlapping within the magnet periphery 62 refers to the coil 52 being inside of the magnet periphery 62 when overlaid in a plane orthogonal to the axis of rotation 48 such as viewed in FIG. 3. In addition, the inner segment 78 is disposed overlapping with the inner magnet set 64. As used herein such overlapping refers to the inner segment 78 being within the bounds of the inner magnet set 64 when overlaid in a plane orthogonal to the axis of rotation 48 as viewed in FIG. 3. Similarly, the outer segment 80 is disposed overlapping with the outer magnet set 70. As used herein such overlapping refers to the outer segment 80 being within the bounds of the outer magnet set 64 when overlaid in a plane orthogonal to the axis of rotation 48 as viewed in FIG. 3. In addition, as further mentioned above, each of the side segments 82, 84 is disposed equally overlapping with the inner and outer magnet sets 64, 70. In this regard, as used herein such overlapping refers to the side segments 82, 84 each being disposed along both of the inner and outer magnet sets 64, 70 when overlaid in a plane orthogonal to the axis of rotation 48 as viewed in FIG. 3.

It is contemplated that the inner segment 78 blends or is otherwise integrated with the side segments 82, 84. Similarly the outer segment 80 blends or is otherwise integrated with the side segments 82, 84. In this regard, the side segments 82, 84 refer to those portions of the coil 52 associated with a significant transition in direction between those adjacent portions of the inner and outer segments 78, 80.

According to various embodiments, the coil 52 may take various shapes. In the embodiment shown in FIGS. 1–3 and 5 the coil 52 is oval shaped. The outer segment 80 may be longer than the inner segment 78. The coil 52 may be disposed within a plane orthogonal to the axis of rotation 48. The field directions of the first inner magnet 66, the second inner magnet 68, the first outer magnet 72, and the second outer magnet 74 may be parallel to the axis of rotation 48.

While the magnetic element 54 may be formed of multiple magnets (such as the inner magnet set 64 and the outer magnet set 70), it is understood that the magnetic element 54 may be a single magnet with the first inner magnet 66, the second inner magnet 68, the first outer magnet 72, and the first outer magnet 74 being associated with poles of the magnetic element 54. Similarly it is understood that the magnetic element 56 may be a single magnet as well with various portions being associated with alternating polarities.

In addition, the first inner magnet 66, the second inner magnet 68, the first outer magnet 72, and the second outer magnet 74 may be generally arced rectangular shaped. In this regard, the first inner magnet 66, the second inner magnet 68, the first outer magnet 72, and the second outer magnet 74 may be defined by various radii extending from the axis of rotation 48. This is contemplated to result in a configuration that maintains the relationship of the side segments 82, 84 in relation to the inner and outer magnet sets 64, 70. As such, the equally overlapping nature of the side segments 82, 84 may be maintained throughout the range of motion of the actuator 30.

As mentioned above, in addition to the magnetic element 54, the disk drive 10 may further include the magnetic element 56 coupled to the disk drive base 12. The coil 52 may be disposed between the magnetic elements 54, 56. The magnetic element 56 may be similarly configured as the magnetic element 54. Thus, the magnetic element 56 may include a magnet periphery, an inner magnet set including first and second inner magnets having opposing field directions, and an outer magnet set including first and second outer magnets. Likewise, such first outer magnet may be circumferentially disposed along the first inner magnet and having a field direction opposite the field direction of the first inner magnet, and such second outer magnet may be circumferentially disposed along the second inner magnet and having a field direction opposite the field direction of the second inner magnet.

Figure 5:
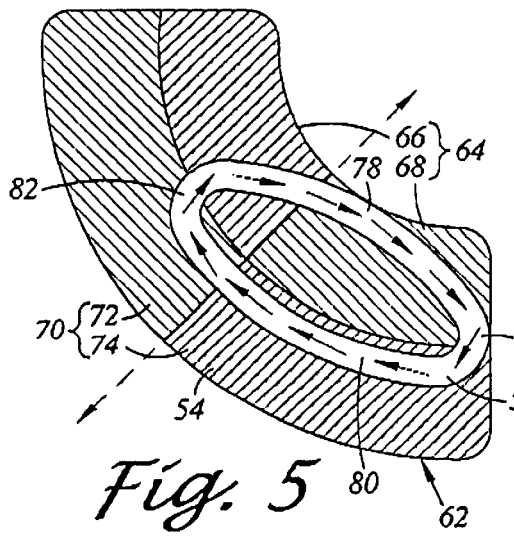
FIG. 5 is the coil and the magnetic element of FIG. 3, however, with the coil rotated in relation to the magnetic element.

Referring now to FIG. 3, the coil 52 is shown in relation to the magnetic element 54 associated with the actuator 30 being in a nominal position. Such a nominal position may correspond to the actuator 30 being disposed such that the transducer heads 42, 44 are halfway between an inner diameter ("ID") data track adjacent the inner disk edge 22 and an outer diameter ("OD") data track adjacent the outer disk edge 20, with the ID) and OD data tracks generally defining a recording surface of the disk 16. Symbolic electromagnetic force lines are indicated associated with the various segments of the coil 52 due to interaction with the magnetic element 54. The force lines correspond to the coil 52 having a current direction as indicated. The first inner magnet 66, the second inner magnet 68, the first outer magnet 72, and the first outer magnet 74 may have polarities as indicated. It is contemplated that a change in direction of the current through the coil 52 would result in a torque applied to the actuator 30 in an opposite direction. As can be appreciated, as indicated in the corresponding force diagram of FIG. 4, the sum of the electromagnetic forces is almost zero or at least of a non-substantial nature with respect to excitation of the butterfly mode of the actuator 30 during nominal operating conditions with the actuator 30 in this nominal position. Nonetheless, this arrangement produces a torque upon the actuator 30. Further, with the actuator 30 in other positions away from the nominal position, such as represented in FIG. 5, the sum of the electromagnetic forces applied to the actuator 30 along directions along the actuator longitudinal axis 76 would gradually increase from that at the nominal position. However, the sum of the electromagnetic forces applied to the actuator 30 along directions perpendicular to the actuator longitudinal axis 76 remain almost zero or at least of a non-substantial nature with respect to excitation of the butterfly mode of the actuator 30 during nominal operating conditions with the actuator 30 throughout the range of motion of the actuator 30.

Figure 6:
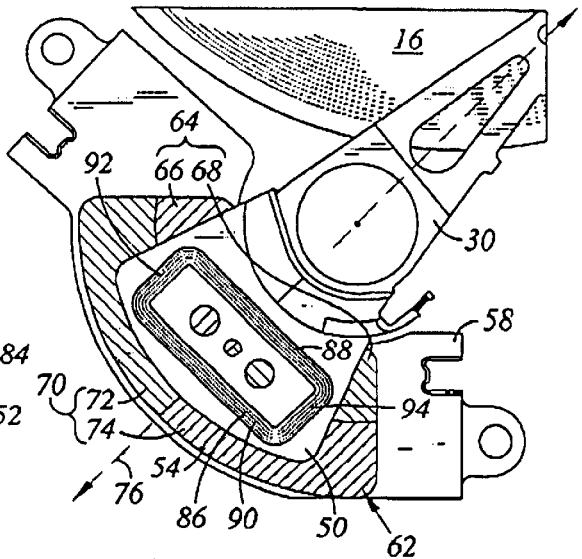
FIG. 6 is a view similar to that of FIG. 2 however with an actuator having a rectangular shaped coil.
Figure 7:
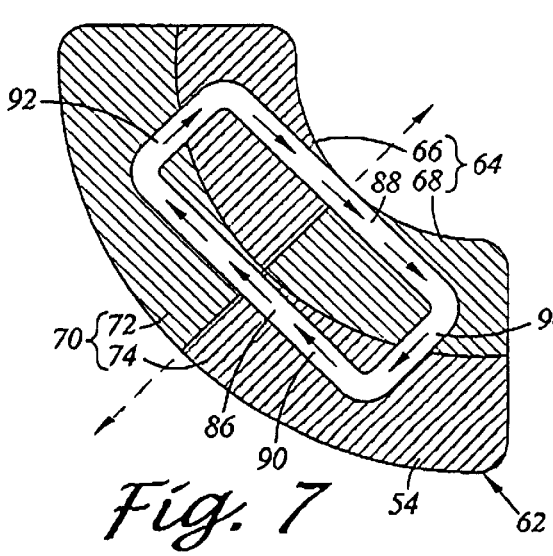
FIG. 7 is an enlarged plan view of a portion of FIG. 6 depicting the coil and the magnetic element with symbolic lines indicative of current through the coil.

Referring now to FIG. 6, according to another embodiment, there is depicted a view similar to FIG. 2, however, with the actuator 30 having a coil 86 substituted for coil 52. As can be seen, the coil 86 is generally rectangular shaped. The coil 86 includes an inner segment 88, an outer segment 90 and a pair of side segments 92, 94. FIG. 7 is an enlarged plan view of a portion of FIG. 6 depicting the coil 86 and the magnetic element 54 with symbolic lines indicative of current through the coil 86. The inner segment 88 is disposed overlapping with the inner magnet set 64. The outer segment 90 is disposed overlapping with the outer magnet set 70. Each of the side segments 92, 94 is disposed equally overlapping with the inner and outer magnet sets 64, 70.

Figure 8:
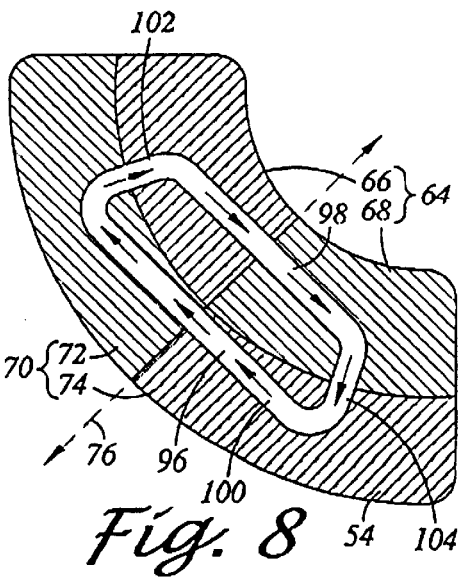
FIG. 8 is a view similar to that of FIG. 5 however with a coil which is trapezoidal shaped and with a magnetic element having portions of equal surface area.

Referring now to FIG. 8, according to another embodiment, there is depicted a view similar to FIG. 3, however, with the actuator 30 having a coil 96 substituted for coil 52. As can be seen, the coil 96 is generally trapezoidal shaped. The coil 96 includes an inner segment 98, an outer segment 100 and a pair of side segments 102, 104. Symbolic lines indicate current through the coil 96. The inner segment 98 is disposed overlapping with the inner magnet set 64. The outer segment 100 is disposed overlapping with the outer magnet set 70. Each of the side segments 102, 104 is disposed equally overlapping with the inner and outer magnet sets 64, 70. In addition, in this embodiment, the first inner magnet 66, the second inner magnet 68, the first outer magnet 72, and the second outer magnet 74 may have substantially equal surface areas disposed towards the coil support 50. In this regard, such equal surface areas result in the equal flux densities associated with each of the first inner magnet 66, the second inner magnet 68, the first outer magnet 72, and the second outer magnet 74.

I claim:

1. A disk drive comprising:
   a disk drive base;
   an actuator rotatably coupled to the disk drive base, the actuator including an actuator body configured to pivot about an axis of rotation and a coil support extending from the actuator body;
   a magnetic element coupled to the disk drive base and defining a magnet periphery, the magnetic element including:
   an inner magnet set including first and second inner magnets having opposing field directions; and
   an outer magnet set including first and second outer magnets, the first outer magnet being circumferentially disposed along the first inner magnet and having a field direction opposite the field direction of the first inner magnet, the second outer magnet being circumferentially disposed along the second inner magnet and having a field direction opposite the field direction of the second inner magnet; and
   a coil attached to the coil support and disposed overlapping within the magnet periphery, the coil including an inner segment, an outer segment, and a pair of side segments electrically connecting the inner and outer segments, the inner segment being disposed overlapping with the inner magnet set the outer segment being disposed overlapping with the outer magnet set, each of the side segments being disposed equally overlapping with the inner and outer magnet sets.

2. The disk drive of claim 1 wherein the first inner magnet, the second inner magnet, the first outer magnet, and the second outer magnet have substantially equal surface areas disposed towards the coil support.

3. The disk drive of claim 1 wherein the first inner magnet, the second inner magnet, the first outer magnet, and the second outer magnet are generally arced rectangular shaped.

4. The disk drive of claim 1 wherein the coil is generally oval shaped.

5. The disk drive of claim 1 wherein the coil is generally rectangular shaped.

6. The disk drive of claim 1 wherein the coil is generally trapezoidal shaped.

7. The disk drive of claim 1 wherein the outer segment is longer than the inner segment.

8. The disk drive of claim 1 wherein the coil is disposed within a plane orthogonal to the axis of rotation.

9. The disk drive of claim 1 wherein the field directions of the first inner magnet, the second inner magnet, the first outer magnet, and the second outer magnet are parallel to the axis of rotation.

10. The disk drive of claim 1 wherein the magnetic element is a first magnetic element, the magnet periphery is a first magnet periphery, the disk drive further includes a second magnetic element coupled to the disk drive base and defining a second magnet periphery, the coil is disposed between the first and second magnetic elements.

11. The disk drive of claim 10 wherein the second magnetic element includes:

an inner magnet set including first and second inner magnets having opposing field directions; and an outer magnet set including first and second outer magnets, the first outer magnet being circumferentially disposed along the first inner magnet and having a field direction opposite the field direction of the first inner magnet, the second outer magnet being circumferentially disposed along the second inner magnet and having a field direction opposite the field direction of the second inner magnet.

* * * * *